(12) United States Patent
Paillarse et al.

(10) Patent No.: US 7,107,695 B2
(45) Date of Patent: Sep. 19, 2006

(54) DEVICE AND PROCESS FOR PROFILE MEASUREMENT

(75) Inventors: Bernard Paillarse, Corbeil Essonnes (FR); Pierre Jamault, Fay les Nemours (FR); Dominique Thibault, Nandy (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 10/808,433

(22) Filed: Mar. 25, 2004

(65) Prior Publication Data

US 2005/0000103 A1  Jan. 6, 2005

(30) Foreign Application Priority Data

Mar. 28, 2003 (FR) .................................. 03 50077

(51) Int. Cl.
*G01B 3/14* (2006.01)
*G01B 5/20* (2006.01)

(52) U.S. Cl. .............................. 33/551; 33/503; 33/555
(58) Field of Classification Search .................. 33/551, 33/555, 556, 503, 558, 559, 561, 549, 553, 33/554, 573, 568, 5
See application file for complete search history.

(56) References Cited

U.S. PATENT DOCUMENTS

| | | | | |
|---|---|---|---|---|
| 3,279,079 A * | 10/1966 | Schiler | ........................ | 33/556 |
| 3,594,908 A * | 7/1971 | Pagella | ........................ | 33/503 |
| 3,823,482 A * | 7/1974 | Schiler | ........................ | 33/520 |
| 3,831,283 A * | 8/1974 | Pagella et al. | ................ | 33/559 |
| 3,840,993 A * | 10/1974 | Shelton | ....................... | 33/1 M |
| 4,166,323 A * | 9/1979 | Maag | ........................ | 33/501.9 |
| 4,307,514 A * | 12/1981 | Ange et al. | ................ | 33/543.1 |
| 4,383,369 A * | 5/1983 | Newton | ....................... | 33/633 |
| 4,450,628 A * | 5/1984 | Rocks | ........................ | 33/833 |
| 4,976,043 A * | 12/1990 | Bieg | ........................... | 33/551 |
| 5,068,972 A * | 12/1991 | Herzog et al. | ............... | 33/503 |
| 5,097,423 A * | 3/1992 | Badinger | .................... | 702/168 |
| 5,097,602 A * | 3/1992 | Cross et al. | ................. | 33/551 |
| 5,505,003 A * | 4/1996 | Evans et al. | ............... | 33/501.7 |
| 5,778,549 A * | 7/1998 | Campanile | .................... | 33/503 |
| 5,917,181 A * | 6/1999 | Yoshizumi et al. | ......... | 250/230 |
| 6,604,295 B1 * | 8/2003 | Nishimura et al. | ........... | 33/554 |
| 6,758,085 B1 * | 7/2004 | Nagaike et al. | ............... | 73/104 |
| 6,804,896 B1 * | 10/2004 | Gass et al. | .................... | 33/558 |
| 6,931,751 B1 * | 8/2005 | LaTulippe | .................... | 33/573 |

* cited by examiner

*Primary Examiner*—Diego Gutierrez
*Assistant Examiner*—Amy R. Cohen
(74) *Attorney, Agent, or Firm*—Oblon, Spivak, McClelland, Maier & Neustadt, P.C.

(57) ABSTRACT

A hand-operated feeler includes a rod on a crossed movement table mounted on a support fitted with an immobilization device at a fixed reference as compared to the part to be measured and a processing unit configured to store and process the results. Such a device results in rapidly measuring the contours of parts including deep and sunken honeycomb cells.

14 Claims, 4 Drawing Sheets

DEVICE AND PROCESS FOR PROFILE MEASUREMENT

BACKGROUND OF THE INVENTION (1) Field of the Invention

The present invention refers to a device and a process for profile measurement.

This can be used notably for complex contour parts such as turbine rotors, to measure the profiles of blade grooves or thin tightness tongues which are sharp peaks designed to etch the annular packing in material which can be sensitive to abrasion, to establish leaktightness by labyrinth seal. The profiles measured could be axial or circular on rotation parts.

(2) Description of Related Art

The metrological devices for profile measurement or more generally for surface contours comprise the following:

the feeler rod comparators and penetration measurement dial, which allow only rudimentary measurements, more accurate feelers but bulky and consequently costly, situated at the end of multiple articulation passive arms fitted with travelling encoders, an example of which is described in the document FR 2 702 043, powered feelers mounted flexibly on a moving support where the movements are measured as and when the motor moves the feeler support and when a bending of the feeler is measured: an example is described in the document U.S. Pat. No. 4,622,751; but only simple movements are possible, non-mechanical devices using photogrammetry and based notably on the reflection of light by the surface to be measured; these are efficient but costly.

The situation is more complicated for the pronounced contour profiles, especially widening out under the surface of the part, which is the case of the blade grooves which are connected at the surface of the part only by a narrower neck. It thus creates a problem for reaching the profile points situated at the bottom of the cavity and above all those of the overhanging parts situated under the neck. Even the feeler mounted on an articulated arm is often insufficient in spite of its flexibility as the feeler must in practice have relatively wide sections in order to possess the required mechanical resistance, and to lodge the passive measuring and maintenance motors of the articulations in stable position. For checks of such profiles, the requester already used gauge sets which were moved up and down the grooves in search of a blocking point or excessive play if any. It is obvious that the gauge sets allow only basic measurements and have the disadvantage of being specific to a given section of grooving. Another method that the requester used consisted in moulding an impression of the groove section, then extracting the mould and measuring its profile under better conditions than the profile of the groove itself. This method, very long, produced good results but was not convenient.

A simple device is being sought after to measure complex or inaccessible profiles, with considerable or hollow contours. A device both simple and inexpensive is required, easy to use and sufficiently accurate—ten or so microns or a few microns for the applications mentioned above.

It has appeared that a hand-operated feeler was the only contour follower likely to offer these advantages although those already mentioned (the comparator and the articulated arm) are clearly insufficient for different reasons.

BRIEF SUMMARY OF THE INVENTION

The device suggested here comprises a feeler, a manipulation knob associated with the feeler, a support, a table with two perpendicular movements associating the support with the feeler, and the means of immobilizing the support as compared to the profile; a pair of displacement transducers situated between the mobile portions of the table and measuring the displacements according to the perpendicular movements; and means of reading and memory storage of the displacements measured.

The means of immobilization can, depending on the case, rest either on the part to be measured itself, or on a support of this part providing a position reference. The operator holds the knob and shifts the feeler right up to touching, then to following the profile. The operator uses the movements of the table in the two perpendicular movement directions whilst taking advantage of the absence of movement possible in the third perpendicular direction to remain in the plane of the profile to be measured. Mobile tables are available which are at the same time sufficiently rigid and fitted with sufficiently accurate displacement transducers to indicate the displacements movements of the feeler with very reduced uncertainty, in spite of the unknown force applied by the operator. In practice the device is flexible enough and does not require considerable manipulation effort, which allows the operator to work sensitively and therefore not to introduce notable deformation of the feeler or other elements of the device.

The invention is also remarkable through a profile measuring process of a part, involving a portable feeler device, comprising the following steps:

calibration of the device, assembly of the device in a fixed position as compared with the part, manual displacement of the feeler along the profile, automatic correction of measurement errors due to wear or deformation of the feeler, using the results of the calibration.

BRIEF DESCRIPTION OF THE DRAWINGS

In order to facilitate the understanding of the present invention, the description of the disclosed invention will be provided with reference to the embodiments illustrated in the appended drawings or figures, wherein like structures are identified with like reference designations. The invention will be described and explained with additional specificity and detail by the use of the accompanying drawings, wherein.

DETAILED DESCRIPTION OF THE INVENTION

Figure 1:
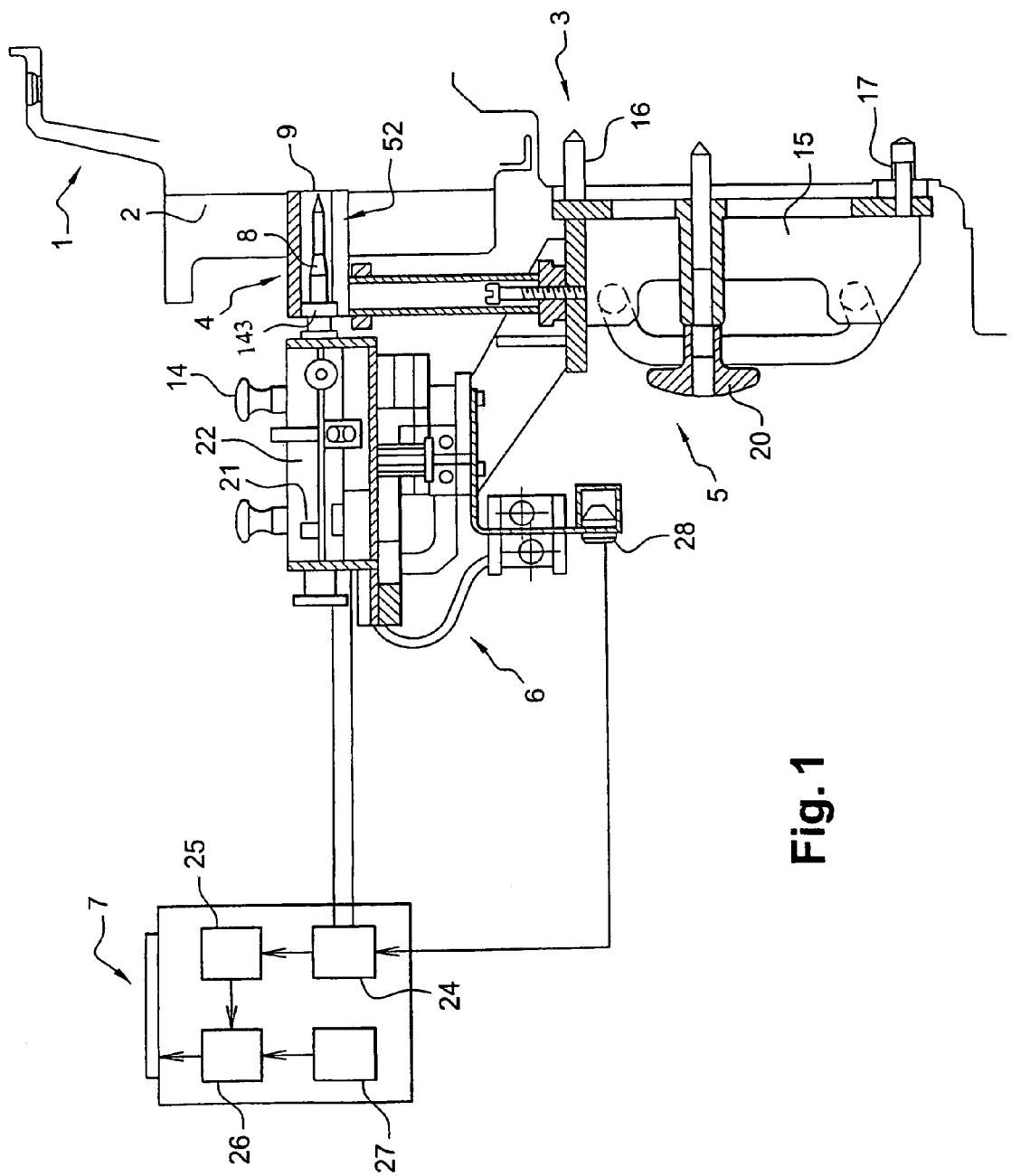
FIG. 1 illustrates an overall view of an embodiment of the invention in use.
Figure 2:
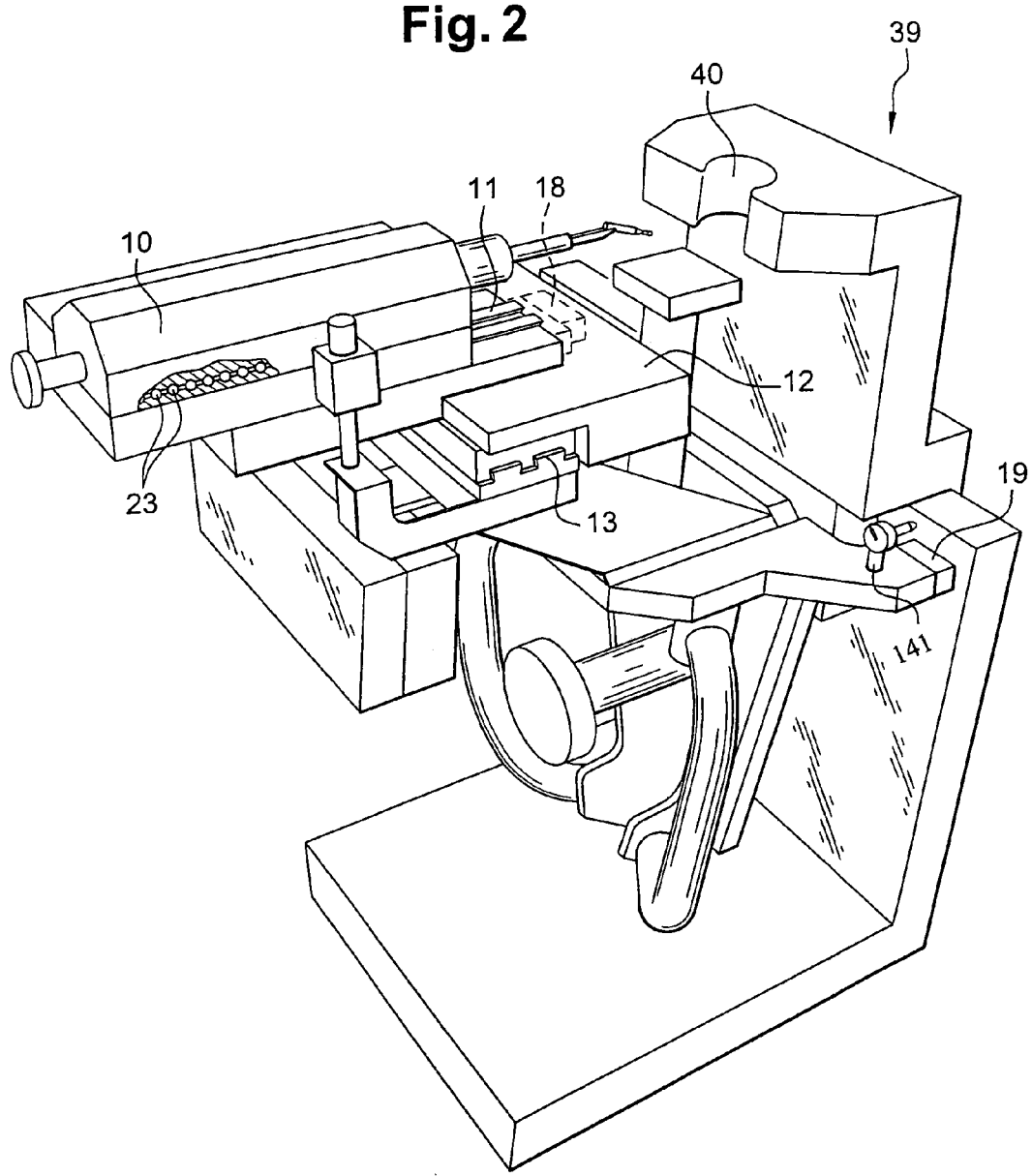
FIG. 2 illustrates a perspective view of the device illustrated in FIG. 1.
Figure 3:
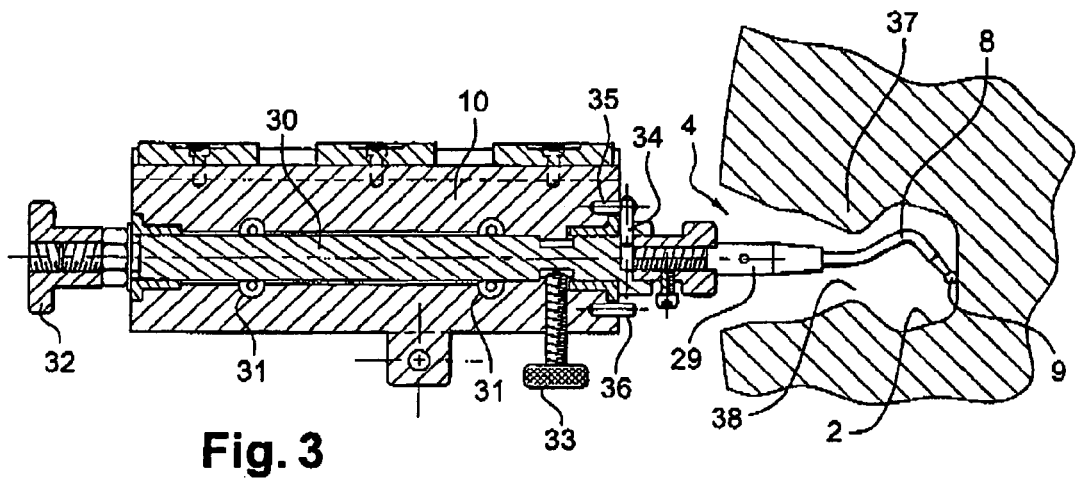
FIG. 3 illustrates details of a feeler of the instant invention with respect to other elements near to the device shown in FIG. 1.

Two fairly different realizations of the device are described hereunder using the following figures. The first FIGS. 1, 2 and 3 illustrate therefore the first realization mode, and the last FIGS. 4 and 5 another mode. The first realization mode applies notably to the control of the blade groove profiles or other deep honeycomb cells on a compressor hub or turbine disk. Please refer first of all to FIG. 1 which is an overall view of the device in action. The disk 1 is mounted on a machining mandrel 3 in a known position. The cutting tool has been adjusted as accurately as possible and has carried out a run in one of the grooves 2, of a blade which is now to be checked using the device. According to the control results of the groove 2, machining of the other grooves 2 could follow, or on the contrary, the tool will be adjusted again.

The device comprises a feeler 4, a support 5, a crossed movement table 6 (also called X Y table) between the feeler 4 and the support 5, and an operating system 7 of essentially computer data type.

The feeler 4 comprises a rod 8 terminating in a ball 9 which constitutes the feeler element. The rod 8 is bent at an angle (FIG. 3) or more generally oblique for reasons that we will explain. Please see also FIG. 2 which is a perspective view of the device. The crossed movement table 6 comprises an initial carriage 10 bearing the feeler 4 and mobile on an initial slide bar 11 in the direction of the rod unit 8, and a second mobile carriage 12 perpendicular to the previous carriage and in the direction of the width of the groove 2 on a second slide bar 13. The initial carriage 10 bears a gripper knob 14 for the operator; the second slide bar 13 is fixed on a support 5.

The support 5 comprises, apart from a shank 15, means of immobilization comprising in this case two pins of which one is circular and the other with bevelled sides 16 and 17, two travel stops 18 and 19, and lastly a screw 20. All these means of immobilization are associated with complementary means fashioned on the mandrel 3, which has been prepared to receive these means. The pin 16 penetrates a circular drill hole, the pin 17 in a recess of corresponding shape, the travel stops 18 and 19 rest on the two flat surfaces, and the extremity of the screw 20 is engaged in an internal screw thread. The pin 16 parallel to the rod 8 of the feeler 4 facilitates directing the rod when the feeler is pushed into the circular drill hole of the mandrel 3; the pin 17 prevents rotation of the support 5 around the gudgeon 16 (pin) and the lateral displacements of the rod 8 whilst giving acceptable precision of lateral and vertical reach; the travel stops 18 and 19, themselves also directed in the same direction as the feeler 4, limit the penetration of the support 5; and the screw 20 holds the support 5 during the check. The movements of the feeler 4 remain free in the directions of the slide bars 11 and 13.

The carriages 10, 12 and the shank 15 of the support 5 are fitted at their junctions with line rules associated with optical encoders 21 and 22 which measure the displacements of the carriages 10 and 12 in their respective directions with a precision in the order of a micron.

The slide bars 11 and 13 are fitted with balls 23 which guarantee precise and rigid guiding, but with little friction. The processing unit 7 comprises a reading circuit 24 connected to optical encoders 21 and 22, a memory 25 connected to the reading circuit 24 and recording its results, and a means of display 26 designed to retrieve the results received in the memory 25 as well as the reference results present in another memory 27. A decision-aid circuit can be added to set out the results displayed more clearly.

The processing unit 7 comprises besides, but on the device, a control knob 28 allowing the start of memory storage of the signals from the optical encoders 21 and 22, or on the contrary the temporary stoppage of these signals. Thus the processing unit 7 is only really active to receive and process these measurements on command from the operator, in practice when the profile to be measured is felt. The displacements other than from the feeler 4, such as erratic displacements between 2 measurements of portions of measurement, are however read so as to continue to have knowledge of the position of the feeler 4. The measurement can thus be interrupted and started again later. This is important in the case under study of the grooves 2. We will now discuss FIG. 3 which gives details of the feeler 4 and the elements near to the device. As we have mentioned, the rod 8 is bent at an angle and at first travels in a sideways direction, then in the other after a straight portion 29. Furthermore, the straight portion 29 is mounted on a shaft 30 as an extension. The shaft 30 turns in the first carriage 10 around bearings 31; a manual rotation is made possible by a knob 32 extending from the first carriage 10 at the opposite end of the feeler 4; a clamping screw 33 facilitates keeping the feeler 4 in an invariable angle position. In practice two angle positions will be preferred and defined by thrust bearings of a stop 34 mounted on the shaft 30 extending radially on a pair of slugs 35 and 36 projecting from the first carriage 10 in the direction of the rod 8. The two stop positions are diametrically opposed. They are suitable respectively for the two halves of the profile of the groove 2, the elbow of the rod 8 being fairly significant to avoid any contact with the edges 37 of the neck 38 of the groove 2.

A profile measurement will comprise therefore two runs, each allocated to travel over one half of the profile. Memory storage of the points is made for the determined shift or displacement steps of the carriages 10 and 12. When one half of the profile has been covered completely, pressing the knob 28 stops memory storage and allows the return of the shaft 30 and the feeler 4 to cover the other half of the profile after having ordered once more the start of the memory storage. An overlap portion of the profile halves exists without this posing any difficulty as the processing unit 7 can superimpose the two readings or produce an average. If the ball 9 is perfectly in line with the shaft 30, the readings of the two profile halves can be superimposed immediately, if not a correction calculation of its lateral displacement when the shaft 30 is turned, must be undertaken in the processing unit 7.

The display means 26 can, in practice, give the shape of the profile controlled, indicate its intrinsic geometrical characteristics or as compared with the hub or disk 1 (as the control device and the hub 1 are both in specific positions on the mandrel 3), or compare the profile measured with admissible profiles. An operation both precise and less empirical than with existing procedures is possible.

A measurement standard 39 (FIG. 2) can be added to the device to check its precision or the capabilities of the operator. The measurement standard itself also comprises complementary means identical to those of the mandrel 3 to hold the device in a particular position such as, for example, a honeycomb cell 40 where the profile slightly resembles the profile to be measured, without the similarity being really necessary. The operator recognizes the profile of the honeycomb cell 40 as in an ordinary measurement, and the processing unit 7 compares the results with the real profile, recorded previously. In this way the operator receives an indication of the accuracy of his work. It is possible to compensate for an excessive manipulation force, producing deformation, or wear of the ball 9 by calculating the average errors on each side of the honeycomb cell 40 and by subtracting these figures from the measurements obtained on the profile to be measured. A cause for uncertainty is in practice the penetration of the stops 18 and 19; comparators 141 can be mounted on the brackets of the shank 15 adjacent to the stops to check just the right penetration of the support 5, in other words the beginnings of sensitivity of the comparators 141 when the travel stop has been set, but without appreciable movement of the rod of the comparators 141. An interesting aspect of the invention is that the feeler 4 maintains its invariable and known directions and that poorly distributed wear of the ball 9 could be compensated for by an exact value for each portion of measurement due to the calibration and knowledge of the portion of ball 9 sliding on each portion of the profile of the part 1 as indeed of the profile of the measurement standard 39.

A case 52 (FIG. 1) surrounds the feeler 4 when the device is screwed in once again so as to provide protection; the feeler is retained on a screw thread 143 at the base of the rod 8.

Figure 4:
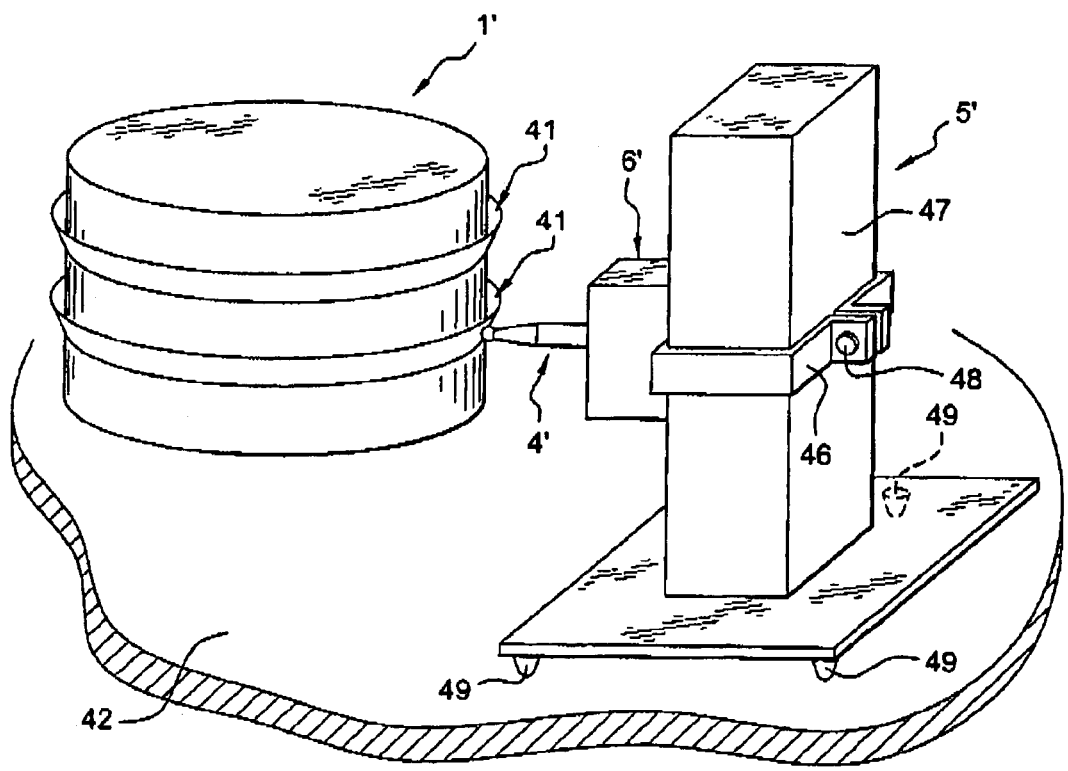
FIG. 4 illustrates an overall view of another embodiment of the invention in use.
Figure 5:
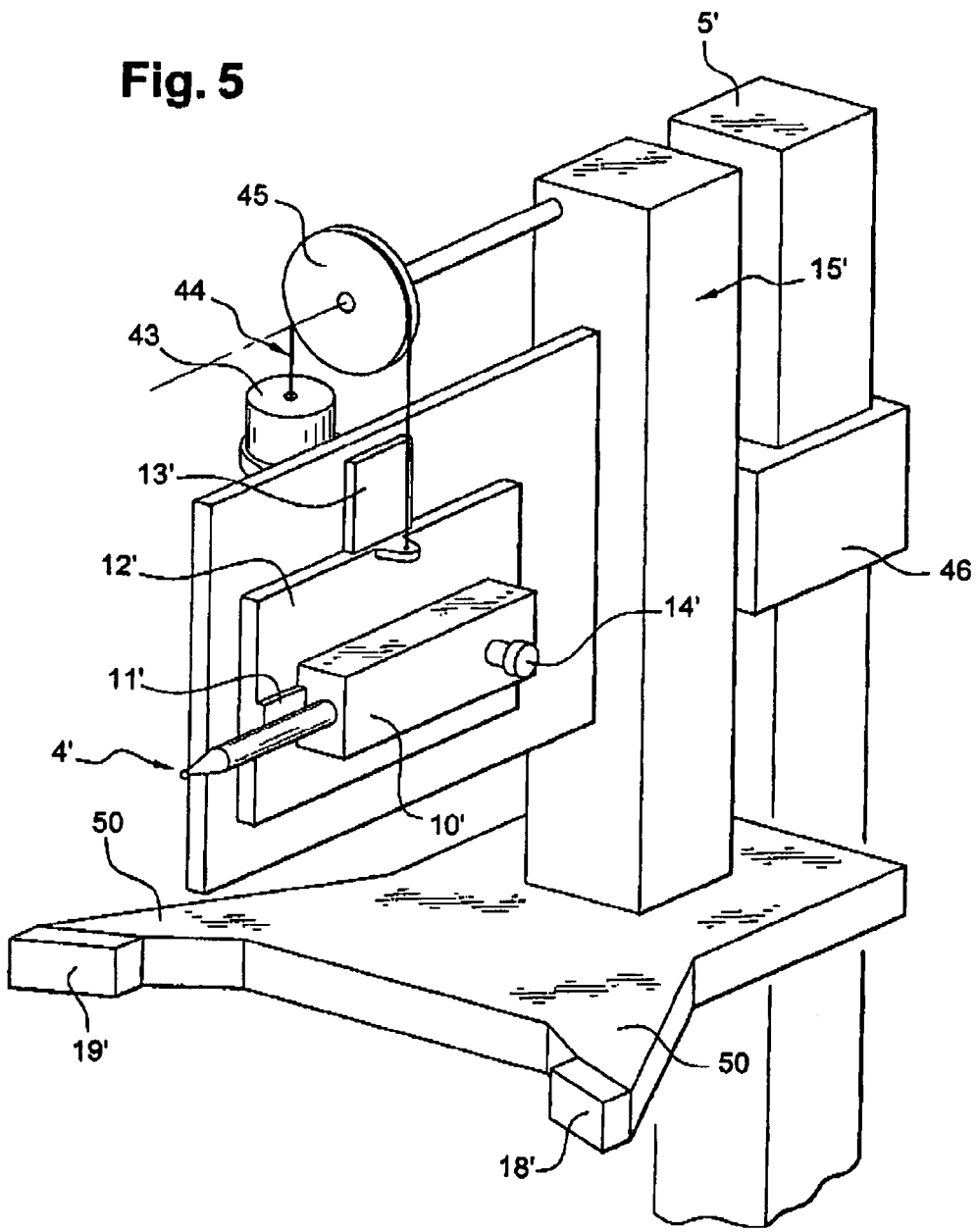
FIG. 5 illustrates a perspective view of the device illustrated in FIG. 4.

The other realization mode comprehensively described in this present description appears in FIGS. 4 and 5 where the first is a general view and the second a detailed view. This comprises, in a similar manner to the previous realization, a feeler 4', a support 5' and an intermediary crossed movement table 6'. The part 1' to be studied is a turbine disk with circular contours and notably thin tongues 41. This is placed on a surface plate 42, in other words, a perfectly smooth surface, in the same way as the support 5'.

The feeler 4' can, in this type of realization, where the honeycomb cells separating the thin tongues 41 are not widened towards the bottom, could have a straight rod and fixed on the crossed movement table 6'; a realization similar to the previous realization could well be reworked.

The crossed movement table 6' comprises, as previously, an initial carriage 10' on which the feeler 4' depends (which in this case is fixed to the carriage), a second carriage 12' supporting an initial slide bar 11' on which the first carriage 10' slides, and a second slide bar 13' fixed to a shank 15' of the support 5'; while however the first slide bar 11' which governs the penetration of the feeler 4' is still oriented in the direction of its rod, the second slide bar 13' which governs the run movement of the contour feeler 4' is in this case vertical, examination of the profile 1' being carried out in this direction.

As the movement of the table 6' is still manual, due to a knob 14' still fixed to the first carriage 10', a fairly stable position of the table 6' is provided by a counterweight 43 which balances the feeler 4', the knob 14' and the mobile parts of the table 6'; this is suspended on the end of a cable 44 held by a pulley 45 turning on the shank 15'; the second carriage 12' is suspended on the other end of the cable 44. Vertical movements of the feeler 4' can in this way be imposed without any notable force, and the feeler 4' can reciprocally be maintained easily at the required height.

The shank 15' of the support 5', carrier of the active parts of the device, comprises a collar 46 which allows this to slide on a column 47; a bolt 48 facilitates tightening this device on the column 47 to adjust the profile measurement to a required height. The column 47 rises from a base 48 resting on the surface plate 42 by three feet 40 which provide an initial immobilization (in both vertical and slanting directions) of the device as compared to the part 1'. The immobilization can be completed by travel stops 18' and 19', similar to the stops 18 and 19 already described, situated at the end of an arm 50 projecting from the two sides of the shank 15'. The travel stops 18' and 19' are positioned to hold the part 1' during a measurement run, which completes the immobilization.

The measurement run consists therefore in realizing the immobilization of the device by placing the latter on the surface plate 42 next to the part 1', and then in advancing the device towards the part up to contact with the travel stops 18' and 19'. The shank 15' is then installed at the required height. Lastly a measurement run is made by manually displacing the feeler 4' and by moving the feeler along the surface contours of the part 1'. A processing unit similar to the unit described previously calculates the measurements.

It is clear that other realization modes are possible.

The invention claimed is:

1. A measurement device configured to measure a profile of a part, comprising:
   a feeler;
   a manipulation knob connected to the feeler;
   a support;
   a table with two perpendicular movements, the table linking the support to the feeler;
   a pair of displacement transducers situated between mobile portions of the table, the pair of displacement transducer being configured to measure displacements according to the perpendicular movements;
   a machining mandrel on which the part comprising the profile is installed; and
   means for reading and storing in a memory the displacements measured, wherein the support and the mandrel are mutually movable and comprise complementary immobilization means,
   wherein the complementary immobilization means comprise a pair of pins.

2. Measurement device according to claim 1, wherein the device comprises a control for a start and a stoppage of the displacement memory storage.

3. Measurement device according to claim 1, wherein the immobilization means of the support are respectively associated to the immobilization means of the mandrel so as to determine one invariable immobilization position of the support on the mandrel.

4. Measurement device according to claim 1, wherein the feeler is configured to maintain a known direction, and the means for reading and storing is configured to compensate the displacement measurements for a wear of the feeler based on a calibration measurement and a knowledge of a portion of the feeler sliding on portions of the profile of the part.

5. A measurement device configured to measure a profile of a part, comprising:
   a feeler;
   a manipulation knob connected to the feeler;
   a support;
   a table with two perpendicular movements, the table linking the support to the feeler;
   a pair of displacement transducers situated between mobile portions of the table, the pair of displacement transducer being configured to measure displacements according to the perpendicular movements;
   a machining mandrel on which the part comprising the profile is installed; and
   means for reading and storing in a memory the displacements measured, wherein the support and the mandrel are mutually movable and comprise complementary immobilization means,
   wherein immobilization means of the support comprise a first pair of travel stops oriented in the same direction as the feeler, the feeler being situated between the travel stops, and the immobilization means of the mandrel comprise flat surfaces for receiving the travel stops.

6. Measurement device according to claim 5, wherein the device comprises reference feelers associated with the first pair of travel stops.

7. A measurement device configured to measure a profile of a part, comprising:
- a feeler;
- a support configured to support the feeler, the support being movable;
- a table with two perpendicular movements, the table linking the support to the feeler;
- a pair of displacement transducers disposed between the mobile portions of the table, the pair of displacement transducer being configured to measure displacements of the feeler;
- a mandrel to hold the part, the mandrel being configured to hold the part during a profile measurement and during a machining of the part;
- an operation device configured to read and store in a memory the displacements measured; and
- means for complementarily immobilizing the support and the mandrel,
- wherein said means for complementarily immobilizing the support and the mandrel comprise a pair of pins.

8. Measurement device according to claim 7, wherein the operation device comprises means for compensating the measured displacements for an excessive manipulation force causing a deformation of the feeler.

9. Measurement device according to claim 7, wherein the feeler is configured to maintain a known direction, and the operation device is configured to compensate the displacement measurements for a wear of the feeler based on a calibration measurement and a knowledge of a portion of the feeler sliding on portions of the profile of the part.

10. A measurement device configured to measure a profile of a part, comprising:
- a feeler;
- a manipulation knob connected to the feeler;
- a support;
- a table with two perpendicular movements, the table linking the support to the feeler;
- a pair of displacement transducers situated between mobile portions of the table, the pair of displacement transducer being configured to measure displacements according to the perpendicular movements;
- a machining mandrel on which the part comprising the profile is installed; and
- means for reading and storing in a memory the displacements measured, wherein the support and the mandrel are mutually movable and comprise complementary immobilization means,
- wherein the device comprises a measurement standard bearer of complementary means for immobilization means of the support, and
- wherein the measurement standard includes a test profile for the feeler and complementary means for the immobilization means of the support.

11. A measurement device configured to measure a profile of a part, comprising:
- a feeler;
- a manipulation knob connected to the feeler;
- a support;
- a table with two perpendicular movements, the table linking the support to the feeler;
- a pair of displacement transducers situated between mobile portions of the table, the pair of displacement transducer being configured to measure displacements according to the perpendicular movements;
- a machining mandrel on which the part comprising the profile is installed; and
- means for reading and storing in a memory the displacements measured, wherein the support and the mandrel are mutually movable and comprise complementary immobilization means,
- wherein the feeler comprises an oblique rod,
- a device for rotating the rod between two diametrically opposed predetermined positions, and a second pair of travel stops of the rod for defining the two opposed positions.

12. Profile measurement process of a part involving a portable feeler device, the process comprising:
- assembling the portable feeler device to a standard, in associating immobilization means on the portable feeler device complementary immobilization means on the standard, and calibrating the portable feeler device to then disassembling the portable feeler device from the standard,
- assembling the portable feeler device at a fixed position as compared with the part, in associating said immobilization means on the portable feeler device to complementary immobilization means on the mandrel, said immobilization means on the mandrel being similar to the immobilization means on the standard,
- manually displacing the feeler along the profile; and
- automatically correcting measurement errors due to wear or deformation of the feeler, using the results of the calibration.

13. A measurement device configured to measure a profile of a part, comprising:
- a feeler;
- a manipulation knob connected to the feeler;
- a support;
- a table with two perpendicular movements, the table linking the support to the feeler;
- a pair of displacement transducers situated between mobile portions of the table, the pair of displacement transducer being configured to measure displacements according to the perpendicular movements;
- a machining mandrel on which the part comprising the profile is installed; and
- means for reading and storing in a memory the displacements measured, wherein the support and the mandrel are mutually movable and comprise complementary immobilization means,
- wherein immobilization means of the support are respectively associated to immobilization means of the mandrel so as to determine one invariable immobilization position of the support on the mandrel,
- wherein the immobilization means of the support comprise a pair of pins, the mandrel comprises recesses having cross-section shapes corresponding to cross-section shapes of the pins, respectively, in which the pins can be engaged, the immobilization means of the support comprise a pair of travel stops, the feeler being situated between the travel stops and the travel stops being oriented in the same direction as the feeler, and the mandrel comprises lands on which the travel stops can abut.

14. A measurement device configured to measure a profile of a part, comprising:
- a feeler;
- a manipulation knob connected to the feeler;
- a support;

a table with two perpendicular movements, the table linking the support to the feeler;

a pair of displacement transducers situated between mobile portions of the table, the pair of displacement transducer being configured to measure displacements according to the perpendicular movements;

a machining mandrel on which the part comprising the profile is installed; and means for reading and storing in a memory the displacements measured, wherein the support and the mandrel are mutually movable and comprise complementary immobilization means, wherein immobilization means of the support are respectively associated to immobilization means of the mandrel so as to determine one invariable immobilization position of the support on the mandrel, wherein the immobilization means of the support comprise a pair of pins, the mandrel comprises recesses having cross-section shapes corresponding to cross-section shapes of the pins, respectively, in which the pins can be engaged, the immobilization means of the support comprise a pair of travel stops, the feeler being situated between the travel stops and the travel stops being oriented in the same direction as the feeler, the mandrel comprises lands on which the travel stops can abut, the immobilization means of the support further comprises a screw, and the immobilization means of the mandrel comprise an internal screw thread in which the screw can be engaged.

* * * * *